United States Patent [19]

Imamura et al.

[11] Patent Number: 4,749,978
[45] Date of Patent: Jun. 7, 1988

[54] MAGNET FOR CATCHING THEREON FOREIGN BODIES WITHIN RETICULUM OR RUMINANT, AND METHOD AND INSTRUMENT FOR MANUFACTURE THEREOF

[75] Inventors: Hironori Imamura, Miyazaki; Mamoru Kawaguchi, Urayasu, both of Japan

[73] Assignee: Denka Seiyaku Kabushiki Kaisha, Kanagawa, Japan

[21] Appl. No.: 96,795

[22] Filed: Sep. 15, 1987

Related U.S. Application Data

[63] Continuation of Ser. No. 671,584, Nov. 15, 1984, abandoned.

[30] Foreign Application Priority Data

Nov. 17, 1983 [JP] Japan ................................ 58-215024

[51] Int. Cl.$^4$ ............................................... H01F 13/00
[52] U.S. Cl. ...................................... 335/284; 335/302; 335/306
[58] Field of Search ............... 335/212, 284, 303, 305, 335/306, 302

[56] References Cited

U.S. PATENT DOCUMENTS

| | | | |
|---|---|---|---|
| 3,153,177 | 10/1964 | McFadyen | 335/306 X |
| 3,462,720 | 8/1969 | Miyata | 335/305 |
| 3,512,023 | 5/1970 | Anthony | 335/212 |
| 3,753,183 | 8/1973 | Aspinwall et al. | 335/305 X |
| 3,858,134 | 12/1974 | Budd | 335/212 |
| 4,283,698 | 8/1981 | Fujisawa | 335/306 |
| 4,494,047 | 1/1985 | Schwalm | 335/212 X |

FOREIGN PATENT DOCUMENTS

| | | | |
|---|---|---|---|
| 50-26769 | 8/1975 | Japan | 335/302 |
| 61-25779 | 8/1986 | Japan | 335/302 |

Primary Examiner—George Harris
Attorney, Agent, or Firm—Wenderoth, Lind & Ponack

[57] ABSTRACT

A bar magnet and an instrument and method of manufacture thereof, in which the magnet is integrally formed of a single material and has circular magnetic poles at selected side portions thereof. The bar magnet is formed by snuggly fitting around an integral bar of magnetizable material, magnetic members of higher magnetic permeability than that of the magnetizable material of the integral bar, at a plurality of local locations along the length of the bar and applying a current to a coil surrounding the bar such that the bar is permanently alternately magnetized north and south axially along the sides of the bar. The coil extends axially up and surrounds the bar and metallic members, and is enclosed in a yoke. The bar magnet is applicable for use in extracting metallic substances from the stomachs of cattle.

15 Claims, 7 Drawing Sheets

MAGNET FOR CATCHING THEREON FOREIGN BODIES WITHIN RETICULUM OR RUMINANT, AND METHOD AND INSTRUMENT FOR MANUFACTURE THEREOF

This application is a continuation of now abandoned application Ser. No. 671,584, filed Nov. 15, 1984.

BACKGROUND OF THE INVENTION

1. Field of the Invention

The present invention relates to a bar which has magnetic poles at selected side portion thereof, and also relates to a method and an instrument for manufacturing the magnet.

2. Description of the Prior Art

When a ruminant, a cow in particular, eats feed, it often eats by mistake metallic foreign bodies, such as wire, nails, etc. having sharp edges, admixed, with the feed. It swallows such metallic foreign bodies without masticating the same due to its own behavior. The metallic foreign bodies are substantially identified with iron scraps and collected in the reticulum of cattle by the movement of the paunch thereof. The reticulum serves not only to effect a chemical action but also to repeat vigorous contraction and relaxation for the purpose of mechanically mixing the feed. For this reason, the metallic foreign bodies laid on the bottom of the reticulum often pierce through or perforate the walls thereof due to the aforementioned vigorous contraction to thereby injure important adjacent organs, such as the diaphragm, pericardium, myocardium, liver, spleen, etc. Such afflictions as this injury cause a number of cattle to go out of use, and inflict dire damage upon the owners.

In order to prevent such injuries due to the presence of metallic foreign bodies as described above from occurring, there has heretofore been adopted oral administration of a bar magnet, such as that having grooves formed in the outer circumference thereof in the lengthwise direction, for example, into the reticulum of cattle. This bar magnet can catch by magnetic attraction the metallic foreign bodies thereon to reduce the injuries to some extent.

However, since a conventional permanent magnet has the north and south poles on the opposite ends thereof, enjoys high remanence in intensity only at the opposite ends, exhibits sudden reduction in magnetic attraction toward the center thereof, and possesses little desired remanence at the intermediate portion thereof, the metallic foreign bodies caught on the surface of the magnet within the reticulum of a ruminant project from the opposite ends of the magnet. As a result, the magnet comes to gain in length and have sharp leading ends, and allows the sharp leading ends to be liable to pierce through the walls of the reticulum.

If a magnet has magnetic poles at the intermediate portion thereof in the lengthwise direction, even when it catches metallic foreign bodies on the opposite ends thereof in a state wherein the metallic foreign bodies protrude from the opposite ends of the magnet, only a slight force exerted thereon causes the substances to be slid on the sides of the magnet and adhered intimately to the side walls of the magnet in the lengthwise direction, thereby making it possible for the magnet to function effectively, to have a large magnetic attraction and to prevent the adverse injuries from occurring. Thus, there is now an increased demand for magnets having strong attractive force at the intermediate portion thereof.

OBJECTS AND SUMMARY OF THE INVENTION

One object of the present invention is to provide a bar magnet having magnetic poles at optional portions of the surface thereof for catching thereon by magnetic attraction extraneous substances within the reticulum of a ruminant.

Another object of the present invention is to provide a method for the manufacture of the aforementioned magnet.

Still another object of the present invention is to provide an instrument adapted to manufacture the magnet.

To attain the objects as described above, the present invention prepares a single material integrally molded, brings metallic members having higher magnetic permeability than that of the material into intimate contact with local portions of the material and applies direct current to an excitation coil within a yoke for magnetization, thereby forming magnetic poles on selected portions except the opposite ends of the magnet, and consequently can provide a magnet capable of effectively catching not only on the opposite ends but also on the central side surfaces thereof extraneous metallic substances, for instance present in the reticulum of a ruminant, and can also provide a method and an instrument for manufacturing the magnet.

These and other objects, characteristic features and advantages of the present invention will become apparent from the further disclosure to be given in detail hereinbelow with reference to the accompanying drawings.

DETAILED DESCRIPTION OF THE PREFERRED EMBODIMENTS

The present invention has been accomplished in consequence of earnest studies on a method for the application of magnetism and keen attention to the fact that intensive remanence is present on the portions of a material to be magnetized into and out of which a large quantity of magnetic flux flows when magnetism is applied to the material. To be specific, manufacture of a multipolar magnet composed of a single material has succeeded by bringing metallic members having magnetic permeability higher than that of a material to be magnetized into locally intimate contact with the periphery of the material, applying magnetism to the material, thereby allowing the magnetic flux to flow into the metallic members locally disposed around the material, and consequently allowing the magnetic flux to repeatedly flow into and out of the material.

The material to be magnetized in the present invention is integrally formed of a single material, such as alnico, ferrite or any other known material for a permanent magnet and may be of a circle or counterweight in cross section, an annular shape, or any shape having concave surfaces or the like.

Magnetism is applied to the material to be magnetized by an ordinary method which comprises putting within a yoke the material having an excitation coil wound therearound and applying direct current to the excitation coil. At this time, metallic members having magnetic permeability much higher than that of the material (members of pure iron, for example) are locally attached closely to the material. This attachment can be achieved by fitting rings of pure iron intermittently around the material. The portions of the material not having any metallic member attached thereto may either be left as being exposed to the atmosphere or be surrounded by a member of magnetic impermeability, such as foamed or foamless plastic members or wooden members, ceramic members, for example. In the latter case, it is possible to manufacture a permanent magnet having any desired distribution of magnetic poles by preparing in advance a container having an inside space which conforms to the shape of a material to be magnetized and which has a pattern comprising portions of high magnetic permeability and portions of magnetic impermeability, setting the material in position within the container, and subjecting the material to magnetization.

The magnet of the present invention is applicable, for example, to a case where extraneous substances within the reticulum of a ruminant are caught by magnetic attraction.

The present invention will now be described with reference to the illustrated embodiments.

Figure 1:
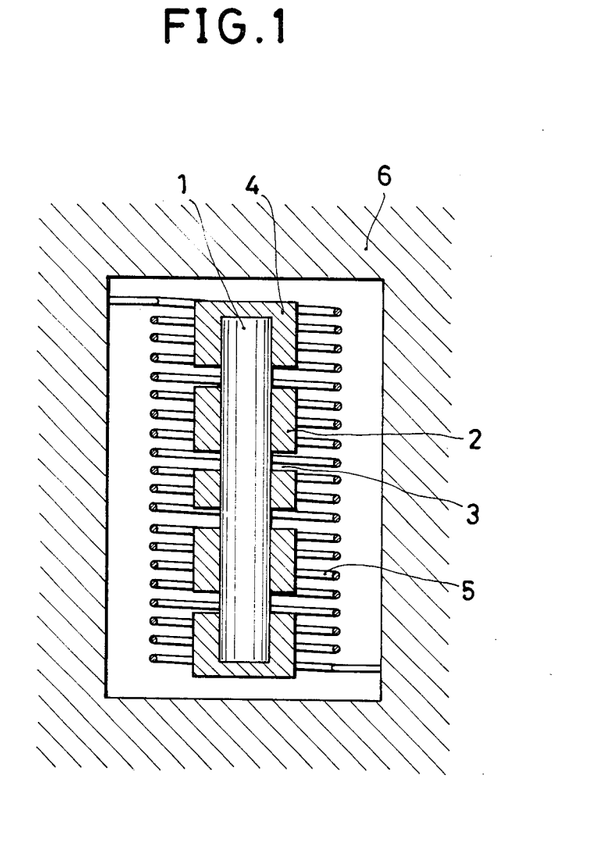
FIG. 1 is an explanatory cross-sectional view showing one embodiment of the magnet-manufacturing method according to the present invention.

FIG. 1 is an explanatory cross-sectional view showing a magnetism-applying method according to the present invention. In FIG. 1, reference numeral 1 denotes a material to be magnetized, reference numeral 2 denotes rings of pure iron, reference numeral 2 denotes bottomed sleeves of pure iron, reference numeral 5 denotes an excitation coil, reference numeral 6 denotes an iron yoke. In this embodiment, the material 1 is made of bar-shaped alnico V about 74 mm in length, three rings 2 are fitted around the material 1 with given intervals 3 therebetween, and two sleeves 4 are also fitted around the material 1 so that the opposite ends of the material 1 reach the bottoms of the sleeves 4 respectively, and are separated from the adjacent rings 2 by the same interval 3. Direct current of 2 to 4 KA has been applied instantaneously to the excitation coil 5 within the yoke 6, according to the well known method of magnetization.

Figure 2:
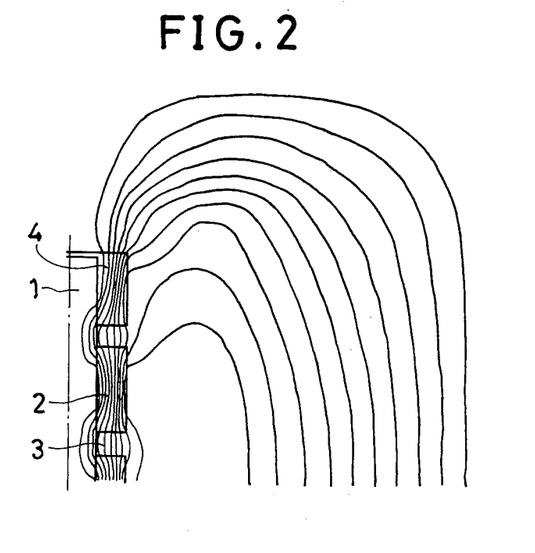
FIG. 2 is a diagram showing the distribution of magnetic flux assumed immediately after the application of magnetism.
Figure 3:
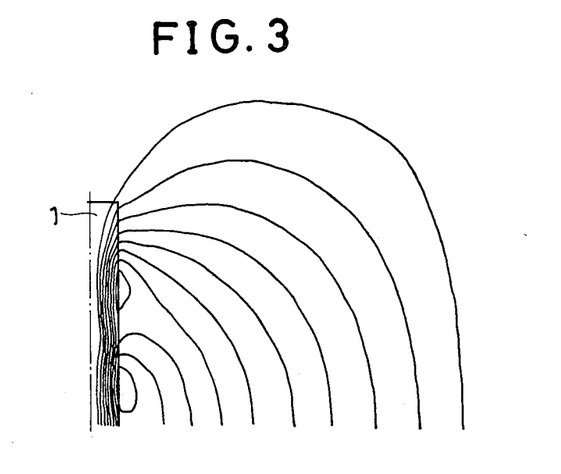
FIG. 3 is a diagram showing the distribution of magnetic flux assumed immediately after the removal of instruments.
Figure 4:
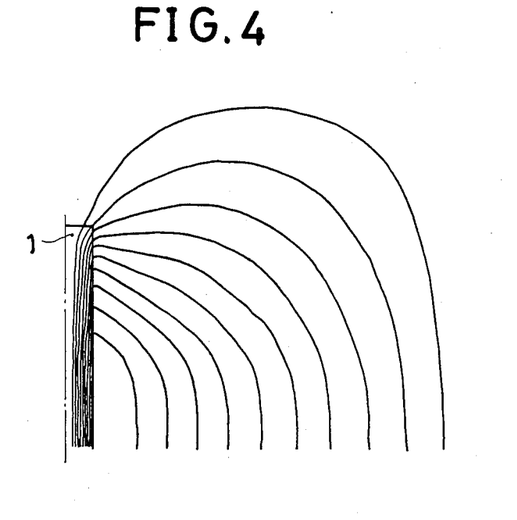
FIG. 4 is a diagram showing the distribution of magnetic flux assumed by a prior art magnet.

The distribution of magnetic flux immediately after the application of magnetism is analyzed by the finite element method and shown in FIG. 2. The magnetic flux distribution of the permanent magnet thus manufactured is analyzed by the finite element method and shown in FIG. 3. For the purpose of comparison with FIG. 3, FIG. 4 shows the magnetic flux distribution of the permanent magnet produced by a prior art method which does not use any iron ring nor sleeve.

Figure 5:
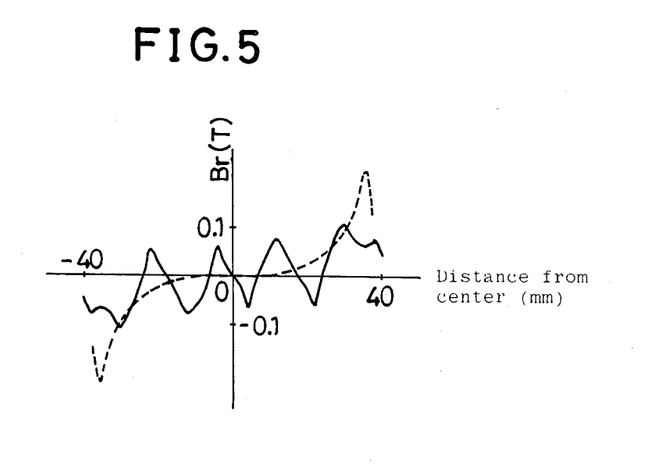
FIG. 5 is a graph showing the distribution of magnetic flux on the side surface of the magnet manufactured by the method shown in FIG. 1.

FIG. 5 shows the distribution of the flux density in the atmosphere 0.8 mm distant from the side surface of the magnet. The lateral axis in this graph is graduated for the distance from the center of the magnet. The flux density distribution obtained by application of magnetism according to the prior art method which does not use any iron member is also shown by a broken line in FIG. 5 for reference.

Figure 6A:
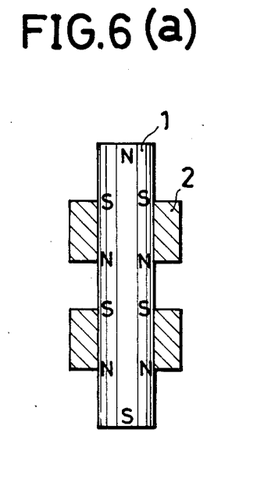
FIGS. 6(a) to 6(c) are explanatory views showing the arrangements of the magnetic poles obtained by different magnetizing methods.
Figure 6B:
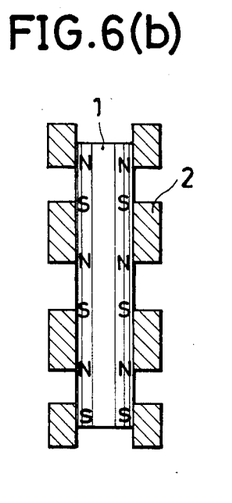
Figure 6C:
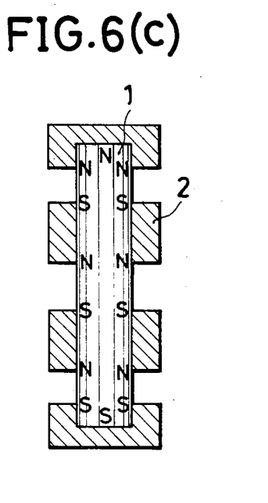

Examples of the relationship between the arrangement of the iron rings 2 including iron sleeves at the time magnetism is applied to the material 1 and the arrangement of the magnetic poles of the bar magnet manufactured are shown in FIGS. 6(a), 6(b) and 6(c). The number of the rings including the sleeves may be increased to five, ten, twenty or more. This increase makes it possible to obtain a magnet having substantially uniform magnetic attraction.

Figure 7A:
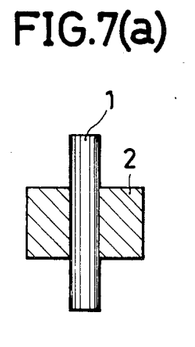
FIGS. 7(a) through 7(d) are explanatory views showing examples of use of the multipolar magnet-manufacturing instruments according to the present invention.
Figure 7B:
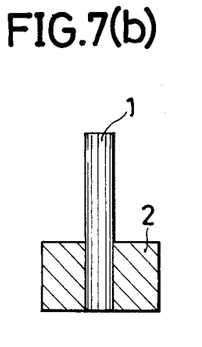
Figure 7C:
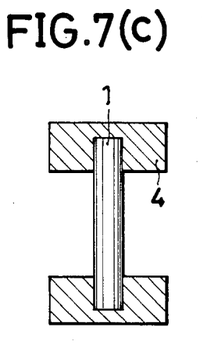
Figure 7D:
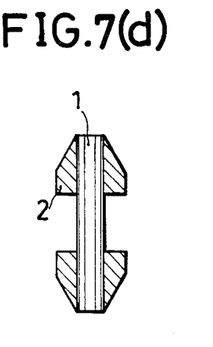
Figure 8:
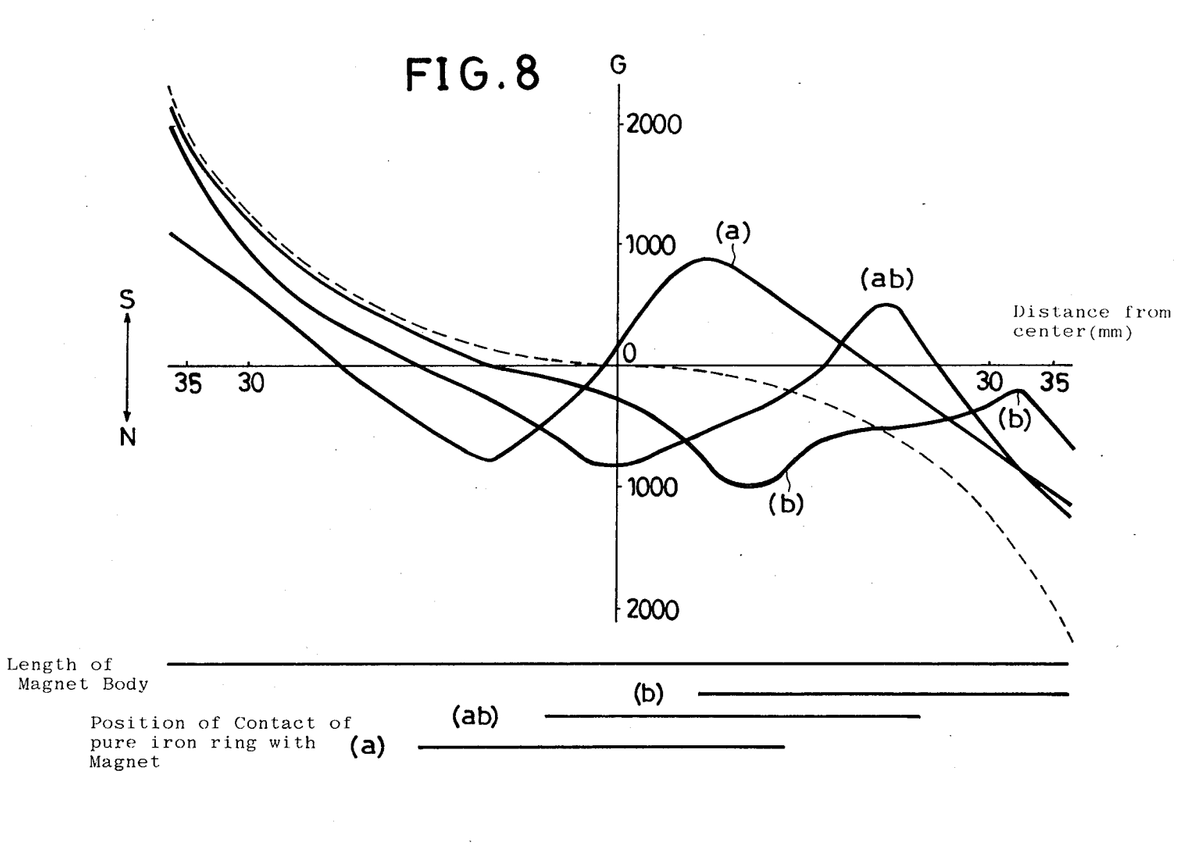
FIG. 8 is a graph showing the relationship between the position of the side surface of the magnet and the remanence in the cases of FIGS. 7(a) and 7(b).
Figure 9:
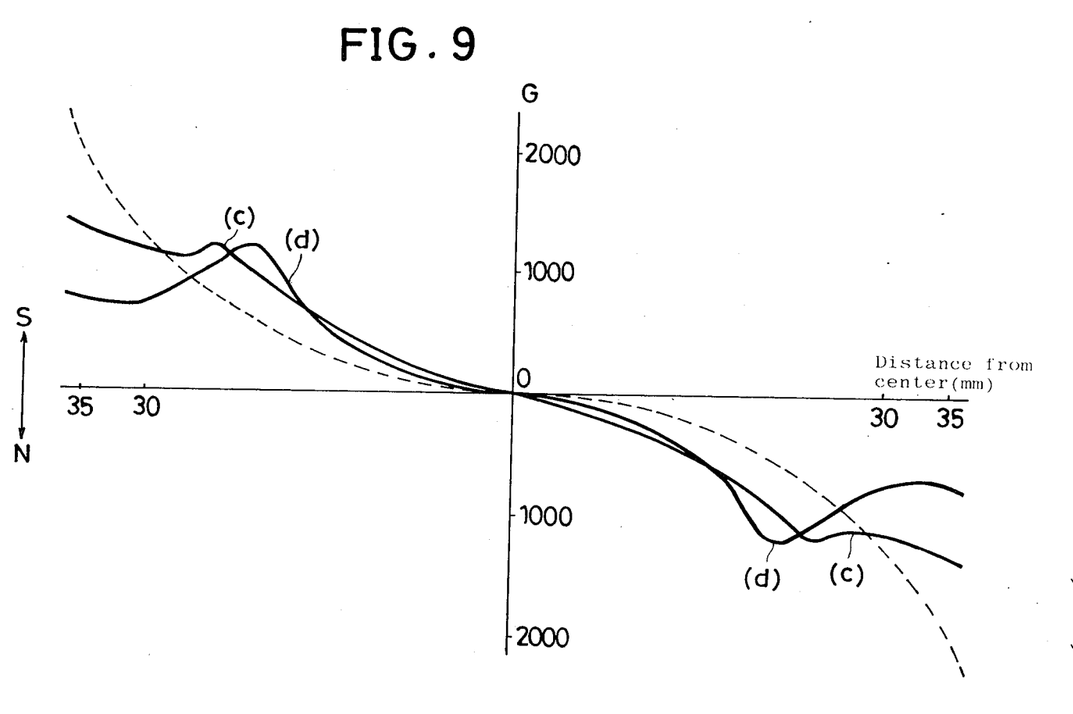
FIG. 9 is a graph showing the relationship between the position of the side surface of the magnet and the remanence in the cases of FIGS. 7(c) and 7(d).

FIGS. 7(a) to 7(d) show examples in which various shapes of pure iron rings including pure iron sleeves are attached to a magnetized material which is made of alnico V 73.5 mm in length and 12 mm in diameter. Each of the examples shown in FIGS. 7(a) to 7(d) is subjected to excitation by applying direct current of 3 KA to a coil wound 30 times around the material to be magnetized within a yoke of pure iron. The results of the treatment conducted on the examples of FIGS. 7(a) and 7(b) and those concerning the examples of FIGS. 7(c) and 7(d) are respectively shown in FIGS. 8 and 9, each showing the relationship between the position of the side surface of the magnet and the remanence. The lateral axis in each of FIGS. 8 and 9 is graduated for the distance from the center of the magnet. The remanence distribution obtained by the ordinary magnetism-applying method which does not adopt any ring is shown by a broken line in each of FIGS. 8 and 9 for comparison with the results obtained in accordance with the present invention. Further, the positions of contact between the ring and the magnet body are shown by (a) corresponding to the example of FIG. 7(a) and by (b) corresponding to the example of FIG. 7(b) below the graph in FIG. 8. Denoted by (ab) is the case where the ring is fitted around a magnetized material at a position lying midway between the position in FIG. 7(a) and the position in FIG. 7(b).

Figure 10:
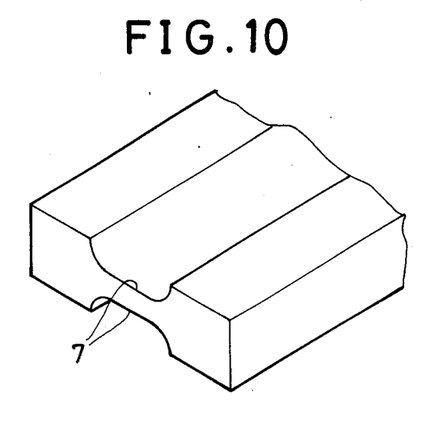
FIG. 10 is a perspective view showing a magnet which has grooves formed therein.
Figure 11:
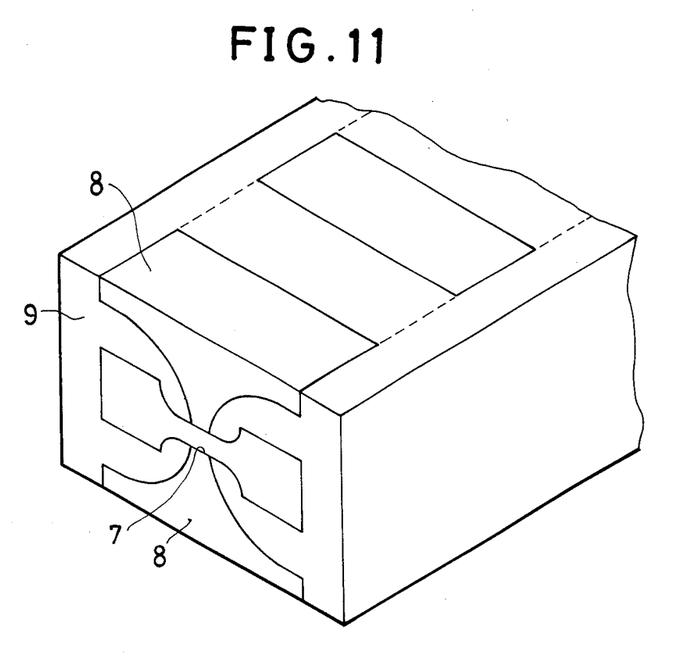
FIG. 11 is a perspective view showing an apparatus for manufacturing the magnet shown in FIG. 10.

When it is desired to give intensive magnetic attraction to the bottoms of grooves 7 of a bar magnet as shown in FIG. 10, iron members 8 are intermittently disposed to contact the bottoms of the grooves 7 and the remaining portions of the bar magnet are surrounded by a foaming polystyrene member 9 as shown in FIG. 11. In this state, excitation is effected by the use of a yoke and an excitation coil to obtain a bar magnet having south and north poles arranged alternately on the bottoms of the grooves. When a continuous iron member 8 is used as shown by a broken line in FIG. 11, for example, the bottoms of the grooves 7 do not have alternate south and north poles, but can exhibit high magnetic flux density as a whole.

What is claimed is:

1. A bar magnetic comprising:
   a single piece of material extending in a longitudinal direction,
   said single piece consisting of magnetic material having north and south poles alternately disposed along said piece in said longitudinal direction, each said north pole and each said south pole extending annularly around the outer circumference of said piece.

2. An instrument for manufacturing a bar magnet formed as a single piece of magnetized material extending in a longitudinal direction and having annular magnetic poles disposed along the piece in the longitudinal direction thereof, said instrument comprising:
   at least one metallic member for forming the annular magnetic poles of the magnet, said member having magnetic permeability that is higher than that of the material prior to being magnetized and being adapted to snugly fit on said material, and said at least one metallic member being one of ring-shaped and sleeve-shaped so as to extend around the material when snugly fit thereon.

3. An instrument as claimed in claim 2,
   and further comprising a yoke and a coil extending in a longitudinal direction within said yoke, and
   wherein said at least one metallic member snugly fitted on said material extends within said coil in said longitudinal direction so that when current is applied to said coil, annular north and south magnetic poles are formed which are alternately disposed along the piece in the longitudinal direction.

4. A method of manufacturing a bar magnet formed as a single piece of magnetized material extending in a longitudinal direction and having annular magnetic poles disposed along the piece in the longitudinal direction thereof, said method comprising:
   fitting at least one metallic member having magnetic permeability that is higher than that of the material from which the magnet is manufactured snugly around a circumferential portion of the piece;
   disposing the piece with the at least one metallic member snugly fit thereon within an exitation coil with the piece and the coil extending in generally the same direction; and
   applying direct current to said coil.

5. A method as claimed in claim 4,
   wherein said snugly fitting of said at least one metallic member around a circumferential portion of the piece comprises snugly fitting at least two metal rings around respective circumferential portions of the piece that are spaced apart from one another.

6. A method as claimed in claim 4,
   wherein said snugly fitting of said at least one metallic member around a circumferential portion of the piece comprises fitting at least one pure iron member around said circumferential portion.

7. A magnet according to claim 1, wherein said bar magnet has at least two north poles and at least two south poles alternately arranged substantially equidistantly in said longitudinal direction.

8. A magnet according to claim 7, wherein there are three north poles and three south poles.

9. A magnet according to claim 1, wherein said piece is formed of alnico.

10. A magnet according to claim 7, wherein said piece is formed of alnico.

11. A magnet according to claim 8, wherein said piece is formed of alnico.

12. A magnet according to claim 1, wherein said piece is formed of ferrite.

13. A magnet according to claim 7, wherein said piece is formed of ferrite.

14. A magnet according to claim 8, wherein said piece is formed of ferrite.

15. An instrument according to claim 2, wherein said metallic member of pure iron.

* * * * *